June 23, 1936.   L. MELLINKOFF   2,044,950
VALVE SEAT REPLACEMENT
Filed April 11, 1932
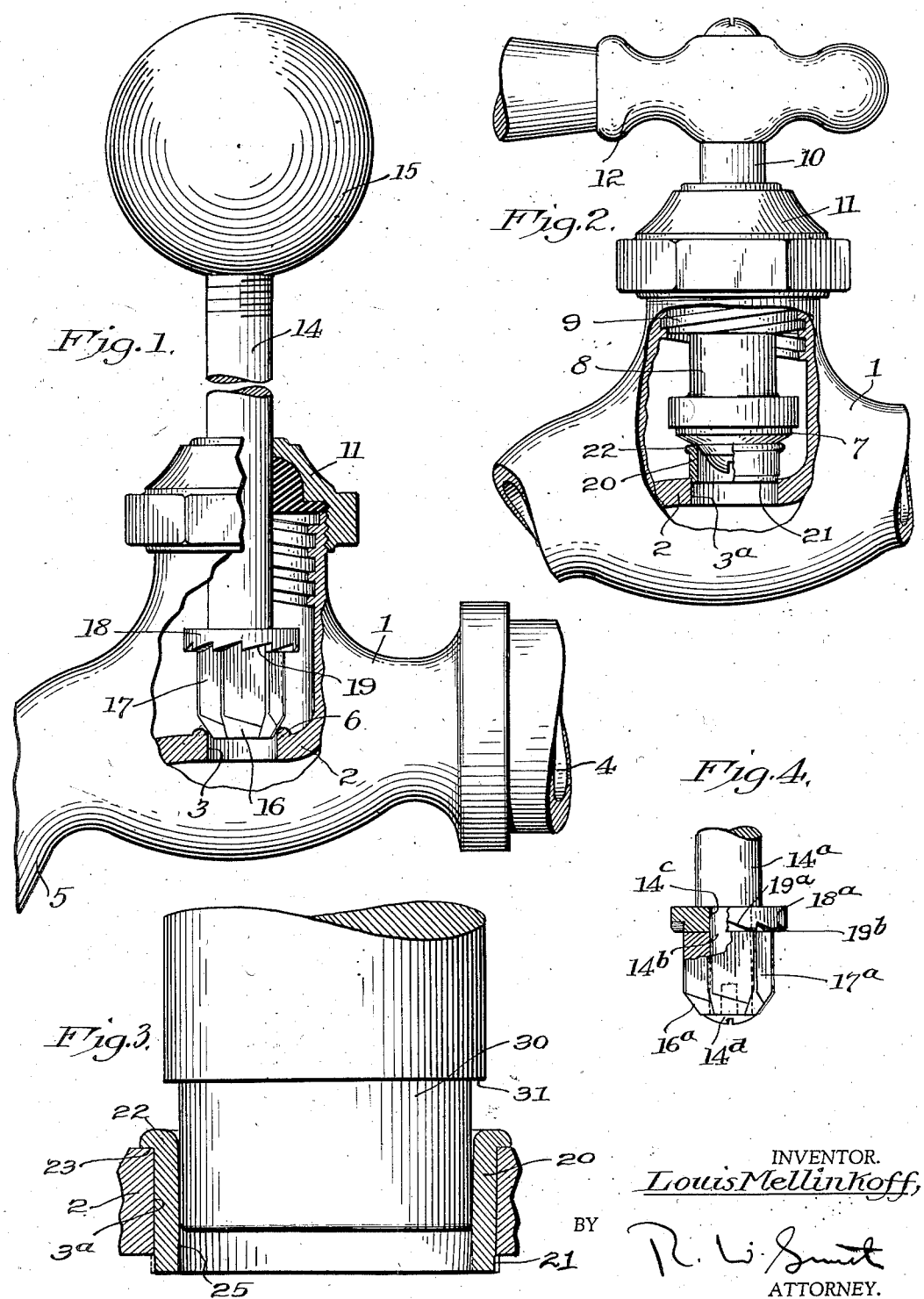
INVENTOR.
Louis Mellinkoff,
BY
ATTORNEY.

Patented June 23, 1936

2,044,950

UNITED STATES PATENT OFFICE 2,044,950

VALVE SEAT REPLACEMENT

Louis Mellinkoff, Los Angeles, Calif.

Application April 11, 1932, Serial No. 604,449

8 Claims. (Cl. 29—157.1)

This invention relates to the replacement of valve seats of faucets, bibbs, etc.; and has for its object to readily cut away a worn valve seat and then substitute a new valve seat unit.

More particularly the invention is applicable to that type of faucet, bibb or other valvular structure wherein the valve seat is an integral part of a partition extending transversely of the valve casing and having a bore surrounded by the valve seat whereby the intake of the casing communicates with its outlet, with the invention providing for reaming out the said bore and cutting away the valve seat so as to prepare the reamed opening for reception of a replacement unit which constitutes a new valve seat, and the new valve seat unit being adapted to be forced into place by the valve head which cooperates with the seat, and being securely held in operative position against the possibility of accidental displacement.

Further objects of the invention will be readily understood from the following description of the accompanying drawing, in which:

Fig. 1 is a side elevation of a valvular structure, partly broken away, and showing the method of cutting away a worn valve seat.

Fig. 2 is a similar view showing the method of forcing the new valve seat unit into place.

Fig. 3 is a detail axial section through the new valve seat unit, showing a method of locking it in place.

Fig. 4 illustrates a modification of the drill employed for cutting away the worn valve seat.

The invention is applicable to various valvular structures, and is herein illustrated and described in connection with a usual faucet or bibb comprising a valve casing 1 having transverse partition 2 provided with a bore 3 whereby the inlet 4 communicates with the outlet 5. An annular bead 6 is integral with partition 2 and surrounds the bore 3 as shown in Fig. 1, so as to form a valve seat for a cooperating valve head; and as shown in Fig. 2 the valve head 7 is raised and lowered by a stem 8 having usual threaded engagement 9 with the casing 1, with the shank 10 of the stem projecting outwardly through a usual bonnet 11 and provided with an operating handle 12.

When the valve seat becomes worn bonnet 11 and valve stem 8 are removed, and the shank 14 of a suitable drill is projected through the bonnet 11 which is then replaced on the valve casing as shown in Fig. 1, so that the drill is adapted for rotation by a detachable handle 15 which is threaded onto the outer end of its shank. The drill comprises drilling blades 16 at its forward end terminating in reaming blades 17 extending longitudinally of the drill; and an overhanging shoulder 18 at the rear ends of the reaming blades is provided with milling blades 19.

The shank 14 has a snug rotary fit in bonnet 11 so as to accurately aline the drill with the bore 3, and the drill is of suitable size whereby rotation of its shank while exerting longitudinal pressure thereagainst causes the blades 16 to first enlarge the bore 3 with the blades 17 then reaming out the enlarged bore and the blades 19 finally cutting away the worn bead 6, so as to leave an enlarged bore of predetermined size and with bead 6 completely removed as shown at 3a in Fig. 2.

Bonnet 11 is then again removed and the drill withdrawn, and a replacement unit comprising a sleeve 20 is then inserted in the valve casing for reception in the enlarged bore 3a. The sleeve is of a length somewhat greater than the thickness of partition 2, and is of uniform exterior diameter throughout the major portion of its length whereby it may be forced into bore 3a when appreciable longitudinal pressure is exerted against the sleeve; and at its lower end the sleeve is preferably of slightly reduced diameter as shown at 21 so that it may be readily started into the bore 3a as shown in Fig. 2. At its upper end the sleeve 20 has an annular bead 22 which forms an exterior shoulder 23 for limiting telescopic reception of the sleeve in the cooperating bore; and the bead 22 constitutes a valve seat adapted for support on the flush surface of partition 2 which results from completely cutting away the bead 6, so that the bead 22 occupies exactly the longitudinal space of the original valve seat bead and thus cooperates with valve head 7 in the same manner as that of the original valve seat. By supporting the sleeve 20 as thus described, its bead 22 may have an outside diameter corresponding to the outside diameter of the original bead 6, and the bore of the replacement sleeve, the end of which defines the inside diameter for bead 22, may correspond to the diameter of the original valve seat bore. Since the original bead is only partly cut away by the radial reaming cut with the longitudinal milling cut then removing the remainder of the original bead, the bore of the original valve seat is only slightly enlarged by the cutting tool, and therefore the sleeve 20 need have only a relatively thin annular wall and still provide an inside diameter adapted to maintain the original diameter of the valve seat bore and an outside diameter adapted for snug fit in the but slightly enlarged original valve seat bore.

After the replacement sleeve 20 has been started into bore 3a the valve stem 8 and bonnet 11 are operatively assembled with relation to valve casing 1 as shown in Fig. 2, and by turning handle 12 the valve head 7 is then lowered against the sleeve 20 so as to force the latter into operative position in its bore 3a as shown in Fig. 3. The valve is then ready for use, with the worn valve seat 6 replaced by the new valve seat 22, and the sleeve 20 securely held in place making fluid-tight engagement with partition 2 by having been forced into its cooperating bore 3a. It will be noted that in order to form the shoulder 23 the bead 22 must project radially outwardly beyond the sleeve 20. Therefore if the bore of the original valve seat were reamed out to the full outer diameter of the original bead, the bead 22 would have to extend radially outwardly beyond the space occupied by the original bead in order to form a shoulder 23 which would be adapted for support upon the transverse partition 2. On the other hand by reaming out the original bead to a diameter less than its full outer diameter as in the present invention, the bead 22 forms a shoulder 23 which is adapted for support upon the transverse partition 2, without the necessity of extending the bead 22 radially outwardly beyond the space occupied by the original bead.

If desired the sleeve 20 may be positively locked in place by slightly downwardly convergently tapering its bore as shown at 25. If this tapering bore is employed, bonnet 11 and valve stem 8 are removed after the sleeve 20 has been seated as shown in Fig. 3, and a cylindrical mandrel 30, preferably shouldered as shown at 31, is then forced downwardly through the bore of the sleeve. The mandrel is of a diameter to wedge in the lower end of the tapering bore of the sleeve and thus radially flare the lower end of the sleeve which extends below partition 2, so that the flared lower end of the sleeve forms a shoulder as shown by broken lines in Fig. 3, adapted to abut against partition 2 for positively locking the sleeve in place. The shoulder 31 of the mandrel, by its abutment against bead 22 limits the wedging reception of the mandrel in the sleeve so that the lower end of the sleeve is sufficiently flared to insure a tight locking engagement, but without so tightly wedging the mandrel in the sleeve that the mandrel cannot be readily withdrawn. The sleeve 20 being thus positively locked in place and the mandrel 30 having been withdrawn, the bonnet 11 and valve stem 8 are again operatively assembled so that the valve is ready for use.

At Fig. 4 I have shown a modification of the drill employed for cutting away the worn valve seat, the improved construction having means for indicating to the operator when the worn seat has been properly cut away. For this purpose the drilling and reaming blades 16a—17a extend in the opposite circumferential direction to that of the milling blades 19a. In other words if blades 16a—17a are right-hand blades, the blades 19a are left-hand blades, and vice versa. It will thus be seen that when the drill shank 14a is rotated in the direction for reaming out the bore 3 so as to finally bring the blades 19a into contact with the bead 6, continued rotation of the drill in the same direction will not cause a cutting action by the oppositely disposed blades 19a, and the operator by feeling when the cutting action thus ceases is notified when the bore 3 has been properly reamed out ready for the bead 6 to be cut away. The drill shank is then rotated in the opposite direction for cutting away bead 6 by means of the milling blades 19a, and the operator having been advised when this milling cut starts, can better gauge the necessary cut for completely removing the bead. Furthermore the outer edges of the milling blades 19a are preferably beveled as shown at 19b, so that when bead 6 has been cut away flush with partition 2, the beveled edges 19b by their engagement with the surface of the partition will interrupt the milling cut, in order that the feel of the tool may definitely indicate to the operator that the bead 6 has been completely cut away. For purpose of assembly the shank 14a is preferably provided with a restricted end 14b of non-circular cross-section, as for example by flattening one side of the restricted end as shown at 14c, and the annulus forming blades 16a—17a and the annulus 18a which carries the blades 19a are preferably separate annuli having bores corresponding to the cross-section of restricted end 14b, whereby the blades may be operatively assembled and held against rotation relative to shank 14a, with the parts preferably locked in assembled rotation by a screw 14d.

The invention as thus described provides for economical and convenient replacement of a worn valve seat, without discarding the entire valve casing but simply by cutting out the old valve seat and replacing the same by a unit which may be readily secured in place and which provides a new valve seat adapted to cooperate with the original valve head in the same manner as the original seat.

It will be noted that by means of the radial reaming cut by blades 17 followed by the longitudinal milling cut by blades 19, a supporting surface flush with the surface of transverse partition 2 is prepared, whereby the replacement bead may occupy the space of the original bead without unduly enlarging the diameter of the original valve seat bore. In other words, if a reaming action alone were employed, the bore of the valve seat would have to be appreciably enlarged before all of the original bead would be cut away so as to form a flush surface, thereby necessitating a lengthy cutting operation and requiring a replacement sleeve having a wall of appreciable thickness in order to maintain the original diameter of the valve seat bore. But by first reaming out the bore to a diameter less than the outer diameter of the original bead and then milling off the remainder of the original bead, a flush surface is prepared by a minimum cutting action, and a replacement sleeve having a relatively thin wall is adapted to maintain the original diameter of the valve seat bore. Furthermore, in order that the replacement bead may properly cooperate with the valve head, it is important that the replacement bead have the same inside diameter and longitudinal projection as the original bead, and in order to adapt the replacement bead for reception in valve casings which may provide only a very restricted radial space between the outside of the original bead and the wall of the valve casing, it is also important that the replacement bead have the same outside diameter as the original bead; and by milling off the original bead, rather than relying upon simply a reaming action, the replacement bead may occupy exactly the same space as the original bead, both as regards longitudinal projection and inside and outside diameter of the bead.

I claim:

1. The method of replacing a worn valve seat of a valvular structure wherein a valve seat bead projects longitudinally beyond the surface of the transverse partition in which the valve seat bore is formed, which comprises inserting in the valve seat bore a tool which has circumferentially oppositely disposed reaming and milling blades, and rotating the tool in the direction whereby the reaming blades ream out the bore of the valve seat to an enlarged diameter less than that of the outer diameter of the valve seat bead, arresting said reaming action by engagement of the milling blades with the remaining longitudinally projection portion of the bead, then rotating the tool in the opposite direction for longitudinally cutting away said remaining portion of the bead flush with the surface of the transverse partition, and inserting a sleeve in the enlarged valve seat bore with a laterally projecting valve seat bead at the end of the sleeve supported upon the longitudinally cut away surface of the original bead and occupying the space of said original bead.

2. The method of replacing a worn valve seat of a valvular structure wherein a valve seat bead projects longitudinally beyond the surface of the transverse partition in which the valve seat bore is formed, which comprises inserting in the valve seat bore a tool which has both reaming and milling blades, and rotating the tool so that the reaming blades ream out the bore of the valve seat to an enlarged diameter less than that of the outer diameter of the valve seat bead, thereby leaving a longitudinally projecting portion of the bead adapted for engagement by the milling blades, then rotating and exerting longitudinal pressure on the tool so that the milling blades longitudinally cut away said remaining longitudinally projecting portion of the bead until it no longer projects beyond the surface of the transverse partition, and inserting a sleeve in the enlarged valve seat bore with a laterally projecting valve seat bead at the end of the sleeve supported upon the longitudinally cut away surface of the original bead and occupying the space of said original bead.

3. The method of replacing a worn valve seat of a valvular structure wherein a valve seat bead projects longitudinally beyond the surface of the transverse partition in which the valve seat bore is formed, which comprises reaming out the bore of the valve seat to an enlarged diameter less than that of the outer diameter of the valve seat bead, thereby leaving a longitudinally projecting portion of the bead, then longitudinally cutting away said remaining longitudinally projecting portion of the bead until it no longer projects beyond the surface of the transverse partition, and inserting a sleeve in the enlarged valve seat bore with a laterally projecting valve seat bead at the end of the sleeve supported upon the longitudinally cut away surface of the original bead and occupying the space of said original bead.

4. The method of replacing a worn valve seat of a valvular structure wherein a valve seat bead projects longitudinally beyond the surface of the transverse partition in which the valve seat bore is formed, which comprises reaming out the bore of the valve seat to an enlarged diameter less than that of the outer diameter of the valve seat bead, thereby leaving a longitudinally projecting portion of the bead, then cutting a supporting surface on said longitudinally projecting portion of the bead, and inserting a sleeve in the enlarged valve seat bore with a laterally projecting valve seat bead at the end of the sleeve resting upon said supporting surface and occupying substantially the space of the original bead.

5. The method of replacing a worn valve seat of a valvular structure wherein a valve seat bead projects longitudinally beyond the surface of the transverse partition in which the valve seat bore is formed, which comprises reaming out the bore of the valve seat to an enlarged diameter less than that of the outer diameter of the valve seat bead, thereby leaving a longitudinally projecting portion of the bead, then cutting away said longitudinally projecting portion of the bead until it no longer projects beyond the surface of the transverse partition, and inserting a sleeve in the enlarged valve seat bore with a laterally projecting valve seat bead at the end of the sleeve resting upon the longitudinally cut away surface of the original bead.

6. The method of replacing a worn valve seat of a valvular structure wherein a valve seat bead projects longitudinally beyond the surface of the transverse partition in which the valve seat bore is formed, which comprises reaming out the bore of the valve seat to an enlarged diameter less than that of the outer diameter of the valve seat bead, thereby leaving a longitudinally projecting portion of the bead, then cutting a supporting surface on said longitudinally projecting portion of the bead, and inserting a sleeve in the enlarged valve seat bore with a laterally projecting valve seat bead at the end of the sleeve resting upon said supporting surface.

7. The method of replacing a worn valve seat of a valvular structure wherein a valve seat bead projects longitudinally beyond the surface of the transverse partition in which the valve seat bore is formed, which comprises reaming out the bore of the valve seat to an enlarged diameter less than that of the outer diameter of the valve seat bead, and inserting a sleeve in the enlarged valve seat bore with a laterally projecting valve seat bead at the end of the sleeve resting upon the portion of the original valve seat which immediately surrounds its reamed out bore.

8. The method of replacing a worn valve seat of a valvular structure wherein a valve seat bead projects longitudinally beyond the surface of the transverse partition in which the valve seat bore is formed, which comprises reaming out the bore of the valve seat to an enlarged diameter less than that of the outer diameter of the valve seat bead, and inserting a sleeve in the enlarged valve seat bore with a laterally projecting valve seat bead at the end of the sleeve resting upon the portion of the original valve seat which immediately surrounds its reamed out bore, whereby the bead of the inserted sleeve may occupy substantially the same radial space as that of the original bead.

LOUIS MELLINKOFF.